United States Patent
Bitzi et al.

(10) Patent No.: US 11,130,654 B2
(45) Date of Patent: Sep. 28, 2021

(54) SYSTEM AND METHOD FOR DETERMINING THE POSITION OF AN ELEVATOR CAR OF AN ELEVATOR INSTALLATION

(71) Applicant: Inventio AG, Hergiswil (CH)

(72) Inventors: Raphael Bitzi, Lucerne (CH); Daniel Scherrer, Zürich (CH); André Rüegg, Kloten (CH); Steven Brossi, Zürich (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 16/603,668

(22) PCT Filed: May 8, 2018

(86) PCT No.: PCT/EP2018/061850
§ 371 (c)(1),
(2) Date: Oct. 8, 2019

(87) PCT Pub. No.: WO2018/210627
PCT Pub. Date: Nov. 22, 2018

(65) Prior Publication Data
US 2020/0115188 A1 Apr. 16, 2020

(30) Foreign Application Priority Data
May 18, 2017 (EP) .................................... 17171820

(51) Int. Cl.
*B66B 1/34* (2006.01)
*G06T 7/73* (2017.01)

(52) U.S. Cl.
CPC .............. *B66B 1/3492* (2013.01); *G06T 7/74* (2017.01); *G06T 2207/30241* (2013.01)

(58) Field of Classification Search
CPC ........... B66B 1/40; B66B 1/3492; B66B 3/02; G06T 7/74; G06T 2207/30241
See application file for complete search history.

(56) References Cited

U.S. PATENT DOCUMENTS 6,612,403 B2 * 9/2003 Silberhorn et al. ....... B66B 3/02

FOREIGN PATENT DOCUMENTS

| CN | 1178838 C | 12/2004 |
| CN | 1720188 A | 1/2006 |

(Continued)

OTHER PUBLICATIONS

Yasser Fouda and K. Ragab, "An efficient implementation of normalized cross-correlation image matching based on pyramid," (iCAST 2013 & UMEDIA 2013), Aizu-Wakamatsu, 2013, pp. 98-103, doi: 10.1109/ICAwST.2013.6765 (Year: 2013).*

(Continued)

*Primary Examiner* — Siamak Harandi
(74) *Attorney, Agent, or Firm* — William J. Clemens; Shumaker, Loop & Kendrick, LLP

(57) ABSTRACT

A system and a method determine the position of an elevator car of an elevator installation, which elevator car is arranged movably in an elevator shaft. The system has a computing unit and an image-capturing unit that are arranged on the elevator car. The image-capturing unit records images of shaft components or shaft equipment used for other functions and transmits the images to the computing unit. The computing unit compares a currently recorded image with at least one stored comparison image of the shaft components or shaft equipment in the direction of travel of the elevator car so as to determine the current position of the elevator car in the direction of travel. The computing unit compares the currently recorded image with the stored comparison image also transversely to the direction of travel so as to determine (Continued)

the current position of the elevator car in the direction of travel.

12 Claims, 2 Drawing Sheets

(56) References Cited

FOREIGN PATENT DOCUMENTS

| | | | |
|---|---|---|---|
| CN | 1762782 | A | 4/2006 |
| CN | 201473135 | U | 5/2010 |
| CN | 104016201 | A | 9/2014 |
| CN | 105151940 | A | 12/2015 |
| CN | 105658556 | A | 6/2016 |
| CN | 107148392 | A | 9/2017 |
| EP | 1232988 | A1 | 8/2002 |
| EP | 1232988 | B1 | 7/2004 |
| TW | 201632445 | A | 9/2016 |
| WO | 2016087528 | A1 | 6/2016 |
| WO | 2016096697 | A1 | 6/2016 |
| WO | 2016096698 | A1 | 6/2016 |

OTHER PUBLICATIONS

Lewis, J.P.. (2001). Fast Normalized Cross-Correlation. Ind. Light Magic. 10. (Year: 2001).*

* cited by examiner

SYSTEM AND METHOD FOR DETERMINING THE POSITION OF AN ELEVATOR CAR OF AN ELEVATOR INSTALLATION

FIELD

The invention relates to a system for determining the position of an elevator car of an elevator installation, which car is movably arranged in an elevator shaft, and a method for determining the position of an elevator car of an elevator installation, which car is movably arranged in an elevator shaft.

BACKGROUND

EP 1 232 988 A1 describes a system and a method for determining the position of an elevator car of an elevator installation, which car is movably arranged in an elevator shaft. To this end, an imaging unit arranged on the elevator car acquires image data of a guide rail in the elevator shaft that acts as a shaft fitting and transmits these data to a computer unit. The computer unit extracts a one-dimensional image from the image data of the imaging unit, which image consists of individual pixels and is in the form of an image vector oriented in the direction of travel of the elevator car. This current image is compared in the direction of travel with a stored image in the form of a one-dimensional comparison image vector oriented in the direction of travel by the current image vector being displaced pixel-by-pixel in the direction of travel over the comparison image vector and being compared thereto. The position of the elevator car in the direction of travel in the elevator shaft may be determined from the comparison of the two image vectors.

In contrast, it is in particular the object of the invention to suggest a system and a method for determining the position of an elevator car of an elevator installation that permit a particularly robust determination of the position of the elevator car without it being necessary to provide special code markers that are required only for position determination.

SUMMARY

The system according to the invention for determining the position of an elevator car of an elevator installation, which car is movably arranged in an elevator shaft, has a computer unit and an imaging unit that are arranged on the elevator car. The imaging unit is designed to capture images of shaft components or shaft equipment used for other functions, which images consist of individual pixels, and transmit said images to the computer unit. The computer unit is designed to compare a currently captured image with at least one stored comparison image of the aforesaid shaft components or shaft equipment in the direction of travel of the elevator car in order to determine a current position of the elevator car in the direction of travel. A comparison in the direction of travel is herein understood to mean that the currently captured image or at least a part thereof and the comparison image or at least a part thereof are displaced and compared to one another pixel-by-pixel in or against the direction of travel. In each of the aforesaid comparisons, the currently captured image and the comparison image have a different comparison position. For each comparison position the so-called sum of the quadratic intervals, the so-called global linear cross-correlation or a comparable parameter of the currently captured image and comparison image is determined, for instance. The parameter thus determined is a measure for the correlation or similarity between the currently captured image and the comparison image.

According to the invention, the computer unit is also designed to compare the currently captured image with the stored comparison image transversely to the direction of travel in order to determine the current position of the elevator car in the direction of travel.

In the method according to the invention for determining the position of an elevator car of an elevator installation, which car is movably arranged in an elevator shaft, images of shaft components or shaft equipment used for other functions, which images consist of individual pixels, are captured using an imaging unit arranged on the elevator car. A currently captured image is compared with at least one stored comparison image of the aforesaid shaft components or shaft equipment in the direction of travel of the elevator car in order to determine a current position of the elevator car in the direction of travel.

According to the invention, the currently captured image is also compared with the stored comparison image transversely to the direction of travel in order to determine the current position of the elevator car in the direction of travel.

Analogous to a comparison in the direction of travel, a comparison transversely to the direction of travel is understood to mean that the current image or at least a part thereof and the comparison image or at least a part thereof are displaced and compared to one another pixel-by-pixel transversely to the direction of travel. The currently captured image and/or the comparison image extend in the direction of travel and transversely to the direction of travel, and thus have a plurality of pixels adjacent to one another, both in the direction of travel and transversely to the direction of travel.

In the aforesaid comparison in the direction of travel and transversely to the direction of travel, the position of a reference pattern is determined in an image larger than the reference pattern. In order to determine the position of the elevator car in the direction of travel, only the position of the reference pattern in the direction of travel of the elevator car is evaluated.

Thus, the position of the elevator car in the direction of travel in the elevator shaft may also be reliably detected if the elevator car does not always travel absolutely exactly along an identical travel curve in the elevator shaft, and there may thus be different deviations in the travel curve transverse to the direction of travel. Although the elevator car is guided by a combination of a guide device arranged on the elevator car, for instance in the form of guide shoes and guide rails fixed on the shaft walls of the elevator shaft, this guide always has little clearance, which may easily lead to slightly different travel curves within the elevator shaft, in particular with different loads on the elevator car. This then leads to the imaging unit not always capturing exactly the same portions of the shaft components or shaft equipment relative to the direction transverse to the direction of travel during different journeys. Since the surface structure of the shaft components or shaft equipment captured in the aforesaid images changes or at least may change not only in the direction of travel but also transversely to the direction of travel, the combination according to the invention of comparison in and transversely to the direction of travel makes it possible to provide a reliable determination of the position of the elevator car, even in the case of the described different travel curves. The system according to the invention and the method according to the invention thus permit a particularly robust determination of the position of the elevator car with respect to different travel curves of the elevator car, no special code markers having to be attached in the elevator shaft.

The elevator shaft of an elevator installation is mostly vertically oriented, so that the direction of travel of the elevator car in the elevator shaft extends vertically, apart from minor deviations. The direction transverse to the direction of travel of the elevator car extends horizontally in this case. Thus, the aforesaid position in the direction of travel of the elevator car may be understood to mean the vertical position of the elevator car or the height of the elevator car in the elevator shaft. In the following, for the sake of simplicity, it is assumed that the direction of travel extends vertically as described. However, this does not preclude the direction of travel from extending at an incline or horizontally, at least in portions. In the following, the direction of travel is also called the z direction and the direction transverse to the direction of travel is called the x direction.

The position of the elevator car in the direction of travel is required by an elevator control unit of the elevator installation in order to be able to move and position the elevator car safely and precisely within the elevator shaft. The speed and optionally the acceleration of the elevator car may be determined by means of a temporal observation of the course of the position in the direction of travel. These variables are also used in particular by the elevator control unit. The speed and/or the acceleration of the elevator car may be determined in particular by the computer unit, but also by the elevator control unit.

The elevator car is connected to a drive machine in particular by means of a support means in the form of a cable or a belt. The drive machine can therefore cause the elevator car to move in the elevator shaft.

The imaging unit is in particular designed as a digital camera, for instance in the form of a so-called CCD or CMOS camera. The camera has a resolution of 700-800 pixels (lines) by 400-600 pixels (columns), for instance. The imaging unit may also be designed as a different imaging system that can capture and depict a surface structure. It may thus be designed, for instance, as an infrared camera, scanner, x-ray device, or ultrasound imaging system.

A so-called pixel value, which in particular represents a measure of the brightness value of the surface portion of the captured article, which portion is associated with this pixel, is associated with each of the aforesaid pixels by the imaging unit. The pixel value may be coded with 8 bits, for instance, i.e. a total of 256 different values.

The imaging unit is thus in particular arranged such that the columns extend in the direction of travel (z direction) of the elevator car and the lines extend transversely to the direction of travel (x direction) of the elevator car. The imaging unit is thus arranged on the elevator car such that it can capture images of shaft components or shaft equipment used for other functions. "Shaft components" is understood to mean parts of the elevator shaft that are present for other purposes, for instance shaft walls. "Shaft equipment" is understood to mean parts that are installed during the installation of the elevator car in the elevator shaft, for instance guide rails for guiding the elevator car. The aforesaid shaft components and shaft equipment are thus not primarily constructed or installed in order to permit the position of the elevator car to be determined, but instead serve another purpose, for instance in the case of a shaft wall to form the elevator shaft, or in the case of a guide rail to guide the elevator car.

The one stored comparison image or the plurality of stored comparison images with which a currently captured image is compared are likewise captured by the imaging unit and then stored by the computer unit in a memory unit.

The comparison image may in particular be an image acquired during a prior position determination or part of such an image, a displacement in the current image with respect to the image of the prior position determination in the direction of travel then being determined during the aforesaid comparison of the images. The current position of the elevator car may be determined from the aforesaid displacement and the position determined during the prior position determination. This type of position determination may be called relative position determination.

The currently captured image may also be compared with an entire series of stored comparison images. These comparison images completely cover the possible travel path of the elevator car and may in particular overlap one another. For instance, they may doubly overlap one another, i.e. such that one comparison image overlaps the two adjacent comparison images. The comparison images are in particular captured and stored during a so-called training run. During the training run, a position in the elevator shaft is associated with each comparison image and stored together with the comparison image, so that the position of the elevator car in the elevator shaft may be determined using the aforesaid comparison of the images. This type of position determination may be called absolute position determination. If the position of the elevator car could be determined during the prior position determination, the number of the comparison images required for the comparison may be very limited proceeding from the position thus determined and the speed of the elevator car. If there is no information available about the possible position of the elevator car, for instance during a re-start of the computer unit, in particular a comparison with all stored comparison images must be performed.

In an embodiment of the invention, during the comparison of the currently captured image with the stored comparison image, the computer unit is designed to take into account, in both images, a plurality of pixels adjacent to one another in the direction of travel and transversely to the direction of travel. Thus, the currently captured image used for the comparison and the comparison image used for the comparison have a plurality of pixels arranged adjacently to one another both in the direction of travel and transversely to the direction of travel. Thus, a particularly precise determination of the position of the elevator car in the direction of travel is possible.

The computer unit is in particular designed to determine the position of the comparison image in the currently captured image during the comparison of the currently captured image with the stored comparison image. Thus, only the relatively small comparison images have to be stored, so that a smaller memory unit is sufficient for storing the comparison images. The memory unit and thus the system for determining the position are thus particularly cost effective.

For the aforesaid comparison, in particular only one region of the currently captured image is used and may be called the current comparison region. The current comparison region is a part of the entire image captured by the imaging unit. The comparison region is in particular arranged about the center of the entire image.

To this end, the comparison image has a smaller extension in the x and z directions than the current comparison region of the currently captured image. The comparison image has, for example, 10-30 pixels in the x direction and 20-40 pixels in the z direction. The current comparison region has, for example, 20-40 pixels in the x direction and 30-50 pixels in the z direction, the region having more pixels in each of the two directions than the comparison image.

During the comparison of the two images, the comparison image is displaced pixel-by-pixel both in the direction of travel (z direction) and transversely to the direction of travel (x direction) relative to the current comparison region of the currently captured image and a comparison of the comparison image and of the selected portion of the current comparison region is performed. Thus, there is a comparison in the direction of travel and transversely to the direction of travel. In the following, the selected portion of the current comparison region is also called the image below the comparison image or the image therebelow. If a correlation or an adequate similarity is determined between the comparison image and the selected portion of the current comparison region, it is possible to use the position of the selected portion within the comparison region to find the position of the elevator car in the elevator shaft in the direction of travel.

In the aforesaid comparison, for instance, the so-called sum of the quadratic intervals, the so-called global linear cross-correlation or a comparable parameter of the pixel values of the comparison images is calculated using the pixel values of the selected portion of the current comparison region, i.e. of the image below the comparison image. During a calculation of the sum of the quadratic intervals, a correlation for the current portion of the current comparison region is determined for which the smallest sum value is produced, and this is in particular less than a limiting value. During a calculation of the global linear cross-correlation, a correlation for the current portion of the current comparison region is determined for which the largest correlation value is produced, and this is in particular greater than a limiting value.

During the calculation of the sum of the quadratic intervals, the squares of the difference of the pixel values of the superimposed pixels of the comparison image and of the current portion of the current comparison region of the current image are added up.

During the calculation of the global linear cross-correlation, the products of the pixel values of the superimposed pixels of the comparison image and of the current portion of the current comparison region of the current image are added up.

The computer unit is in particular designed to compare the currently captured image with the stored comparison image by means of a normalized cross-correlation. This permits a particularly certain and robust comparison of the comparison image with the current image and thus a particularly certain and robust determination of the position of the elevator car. This is permitted because the normalized cross-correlation delivers reliable results even when the so-called signal energy is not distributed uniformly in the images. Thus, it is not highly dependent on changes in intensity in the images.

During the calculation of the normalized cross-correlation, the result of the aforesaid global linear cross-correlation is normalized. To this end, the root of the sum of the squares of the pixel values of the comparison image and the root of the sum of the squares of the pixel values of the image therebelow are calculated. For the calculation of the normalized cross-correlation, the result of the aforesaid global linear cross-correlation is divided by the product of the two aforesaid roots. The greater the result of the normalized cross-correlation, the greater the similarity of the comparison image and of the current image therebelow.

In an embodiment of the invention, the computer unit is designed to take into account mean values of the pixel values of the compared images during the normalized cross-correlation. This renders the comparison of the images particularly insensitive to different mean pixel values, that is in particular to a different mean brightness between the comparison image and the image therebelow.

To this end in particular a so-called correlation coefficient is calculated. To this end, as a numerator of each pixel value of the comparison image and of the image therebelow, first the specific mean value of all pixel values of the comparison image and of the image therebelow is subtracted and then the products of the results of the subtractions of superimposed pixels are added up. For a normalization, both for the comparison image and for the image therebelow, the results of the aforesaid subtraction of pixel value and specific mean value for all pixels are squared and then added up. The normalization is then carried out by the aforesaid numerator being divided by the product of the roots of the aforesaid sums.

In an embodiment of the invention, the computer unit is designed to store a post-processed portion of an image captured by the imaging unit as a comparison image, in particular the computer unit is designed to subtract the mean value of all pixel values of the portion from the pixel value of each pixel during the aforesaid post-processing. The mean value of the pixel values of the comparison image determined in this manner is thus 0. This permits a particularly rapid and less computer-intense comparison of the comparison image with the currently captured image.

In an embodiment of the invention, the computer unit is designed to determine and store a structure parameter characterizing the structure of the aforesaid portion, and to take said parameter into account during the comparison of the currently captured image and the stored comparison image. For the determination of the aforesaid structure parameter in particular first the mean value of all pixel values of the comparison image is subtracted from each pixel value of the comparison image. Then the results of the subtraction for all pixels of the comparison image are squared and then added up. The structure parameter produced in this manner is thus the so-called image energy of the result of the aforesaid subtraction of the mean value. This sum or even the root of this sum may be stored as a comparison variable and used when comparing the images.

The structure parameter may in particular be used to perform a rapid and less computer-intense comparison of the comparison image with the currently captured image. It is also possible for the structure parameter to be used to check whether a comparison image may even be used for the described position condition. To this end it may be checked, for instance, whether the structure parameter of the comparison image is greater than a threshold value.

The aforesaid embodiments of the computer unit lead to corresponding embodiments of the method according to the invention.

Further advantages, features and details of the invention are set out in the following description of embodiments and in the drawings, in which identical or functionally identical elements are denoted with the same reference signs.

DETAILED DESCRIPTION

Figure 1:
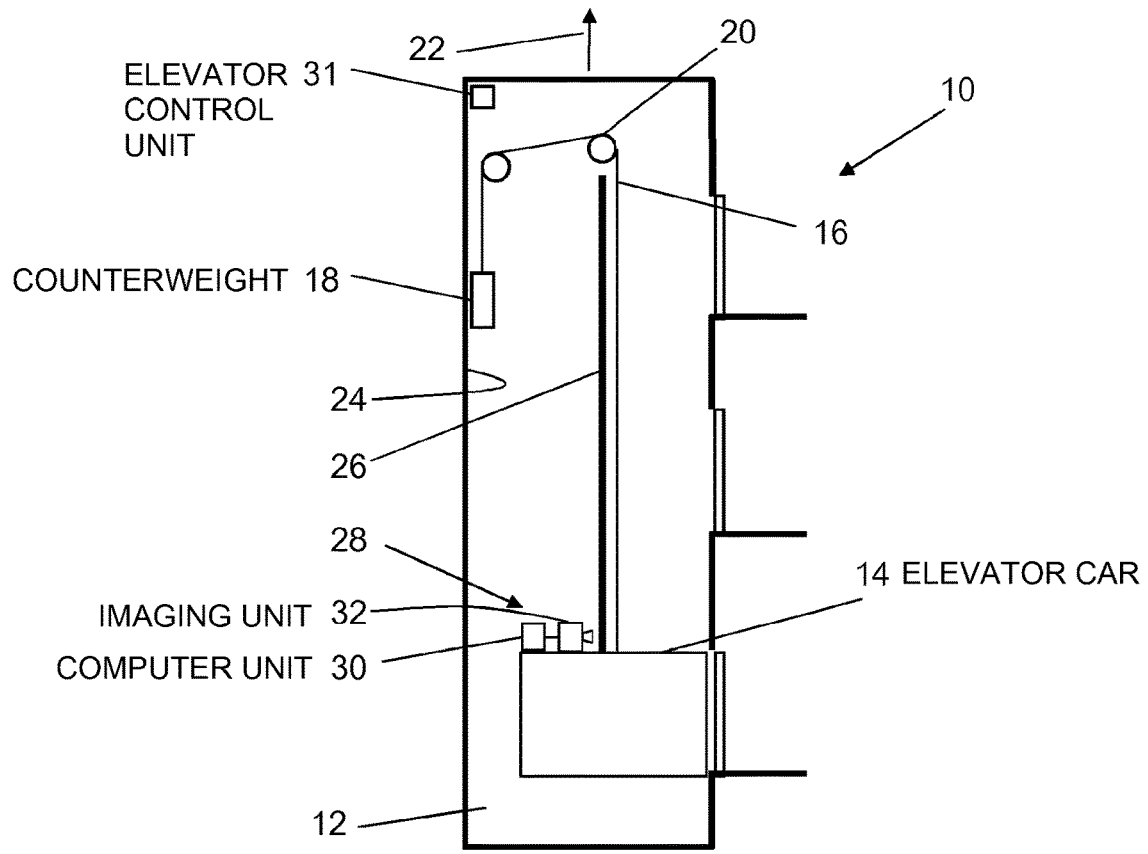
FIG. 1 is a schematic view of an elevator installation having a system for determining the position of an elevator car movably arranged in an elevator shaft.

According to FIG. 1, an elevator installation 10 has an elevator shaft 12 oriented vertically. Arranged within the elevator shaft 12 is an elevator car 14 that is connected to a counterweight 18 in a known manner via a support means 16 in the form of a flexible belt or cable. The support means 16 extends proceeding from the elevator car 14 via a drive pulley 20 that may be driven by a drive machine (not shown) to the counterweight 18. The elevator car 14 can be moved up and down in the elevator shaft 12 by means of the drive machine and the support means 16. The elevator car 14 may thus be moved in the elevator shaft 12 in or counter to a direction of travel 22 that extends vertically upward.

A guide rail 26 that extends in the direction of travel 22 is fixed on a shaft wall 24 of the elevator shaft 12. The shaft wall 24 may be called a shaft component and the guide rail 26 may be called shaft equipment. When the elevator car 14 moves, it is guided along the guide rail 26 via guide shoes (not shown).

A system 28 for determining the position of the elevator car 14 is arranged on the elevator car 14. The system 28 has a computer unit 30 and an imaging unit 32. The imaging unit 32 designed as a digital camera is oriented such that it can capture images of the guide rail 26. It transmits the images of the guide rail 26, which images consist of individual pixels, to the computer unit 30, which compares a currently captured image with at least one stored comparison image of the guide rail 26 in order to determine a current position of the elevator car 14 in the direction of travel 22. The computer unit 30 transmits the current position of the elevator car 14 via a signal connection (not shown) to an elevator control unit 31 that is arranged in the elevator shaft 12 and that uses the position of the elevator car 14 for controlling the elevator installation 10.

The computer unit does not have to be arranged on the elevator car. It may also be arranged stationary in the elevator shaft and may be connected to the imaging unit via a signal connection. The imaging unit could also capture images of the shaft wall and transmit them to the computer unit.

Figure 2:
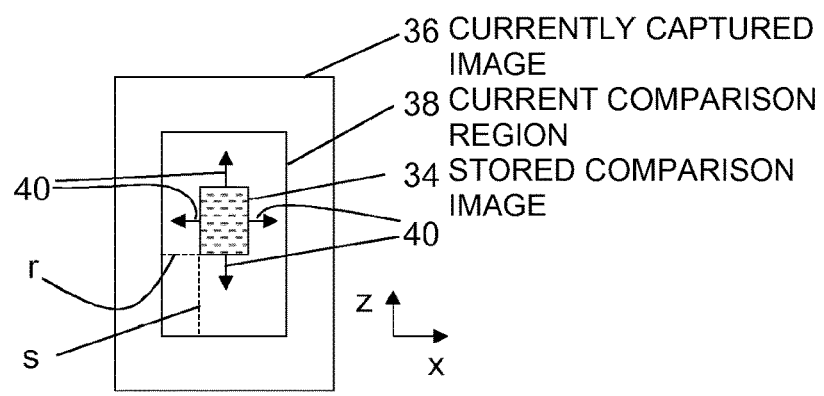
FIG. 2 shows a comparison image within a current comparison region of a currently captured image of shaft equipment of the elevator shaft.

For determining the current position of the elevator car 14 in the elevator shaft 12, the computer unit 30 compares a stored comparison image 34, shown in FIG. 2, with an image 36 currently captured by the imaging unit 32.

Comparison images for relative position determination and for absolute position determination are stored in a memory unit (not shown) of the computer unit 30. A plurality of comparison images 34 are stored for absolute position determination. These comparison images 34 are derived from current images of the imaging unit 32 during a so-called training run during startup of the system 28 and stored. During the training run, the elevator car 14 comprising the system 28 is moved along the entire travel path of the elevator car 14 in the elevator shaft 12. The computer unit 30 derives individual comparison images 34 from the images captured by the imaging unit 32 and associates a position in the elevator shaft 12 therewith. The computer unit 30 thus derives the comparison images 34 such that they doubly overlap one another. They overlap one another in particular such that in each case a comparison image abuts the next-but-one comparison image. The stored comparison images 34 therefore cover the entire travel path of the elevator car 14. As soon as a comparison image 34 is detected in a current image 36 of the imaging unit 32, it is possible find the position of the elevator car 14 in the direction of travel 22 using the position of the comparison image 34 in the elevator shaft 12, which position is also stored.

In order to derive a comparison image 34 from a currently captured image of the imaging unit 32 during the training run, the currently captured image is post-processed by the computer unit 30. To this end, the computer unit 30 first selects a portion in the center of the currently captured image. Then the computer unit 30 calculates the mean value of all pixel values of the selected portion and subtracts the calculated mean value from each pixel value. The result of this post-processing is stored as a comparison image 34. Moreover, additional post-processing, such as for instance deep pass filtering and/or high pass filtering, may be performed.

In addition, for each post-processed and stored comparison image 34 the computer unit 30 determines a structure parameter and stores said parameter together with the comparison image 34. The computer unit 30 proceeds from a post-processed image as described above. It squares the pixel values of all pixels and adds them up. The result of this addition or even the root thereof is stored together with the comparison image 34.

The comparison image for the relative position determination is derived from an image of the imaging unit 32 of the preceding position determination. To this end a portion is selected from this image. The post-processing is carried out analogously to the post-processing of the comparison images 34 for the absolute position determination. The aforesaid portion is selected in particular so as not to be in the region of the center, but instead in a region of the aforesaid image that is in the current direction of travel of the elevator car.

In order to determine the position of the elevator car 14 in the direction of travel 22 during normal operation of the elevator installation 10, the computer unit 30 compares a comparison image 34 with a currently captured image 36 of the imaging unit 32 both in and transversely to the direction of travel 22. The computer unit 30 checks whether a comparison image 34 is contained in a current comparison region 38 of the currently captured image 36. If this is the case, the position of the comparison image 34 in the current comparison region 38 is simultaneously determined. In the following, it is assumed that the comparison image 34 is contained in the current comparison region 38.

In order to determine the position of the comparison image 34 in the current comparison region 38, the computer unit 30 compares the comparison image 34 and the current comparison region 38 of the currently captured image 36 both in the direction of travel (z direction) and transversely to the direction of travel (x direction). To this end the comparison image 34 is displaced pixel-by-pixel both in the direction of travel (z direction) and transversely to the direction of travel (x direction) relative to the current comparison region 38, and for each position a correlation coefficient between the comparison image 34 and the image of the comparison region 38 below the comparison image 34 is calculated. The displacement of the comparison image 34 is symbolized in FIG. 2 by the arrows 40.

The correlation coefficient is calculated using the following formula:

$$k(r,s) = \frac{\sum_{(i,j)\in R}(I(r+i,s+j)-\bar{I}(r,s))*(R(i,j)-\bar{R})}{\sqrt{\sum_{(i,j)\in R}(I(r+i,s+j)-\bar{I}(r,s))^2} * \sqrt{\sum_{(i,j)\in R}(R(i,j)-\bar{R})^2}}$$

where
displacement of the comparison image in the x direction,
displacement of the comparison image in the z direction,
R(i,j)=pixel values of the comparison image at the x position i and z position j,
I(r+i,s+j)=pixel values of the current comparison region at the x position r+i and the z position s+j,
$\bar{R}$=mean value of all pixel values of the comparison image,
$\bar{I}(r,s)$=mean value of all pixel values of the current comparison region below the comparison image displaced by r in the x direction and s in the z direction.

Since, prior to being stored by the computer unit 30, the comparison image 34 was post-processed such that the mean value of all pixel values of the comparison image 34 was subtracted from each pixel value, the term (R(i,j)-$\bar{R}$)

no longer has to be evaluated during the calculation of the correlation coefficients, but rather it is possible to directly use the pixel values of the comparison image 34.

In addition, as described above, a structure parameter of the comparison image 34 is also stored and may be used directly for calculating the correlation coefficient. As above, the term $$\sum_{(i,j)\in R}(R(i,j)-\bar{R})^2$$

is calculated as a structure parameter and either the result or the root thereof is stored. The structure parameter is thus taken into account during the comparison of the currently captured image 38 with the stored comparison image 34.

The correlation coefficient is calculated for each possible position of the comparison image 34 in the current comparison region 38, that is for each possible displacement by r in the x direction and s in the z direction. The correlation coefficients for all possible r and s values produce a three-dimensional surface. The maximum correlation coefficient of the entire surface characterizes the position of the comparison image 34 in the current comparison region 38 with the greatest correlation. Provided that the comparison image 34 is contained in the current comparison region 38, the aforesaid maximum characterizes the position of the comparison image 34 at which there is a correlation between the comparison image 34 and the image therebelow. As an additional check, it may be checked whether the maximum correlation value is greater than a threshold value. Using the information about the position of the comparison image 34 in the current comparison region 38 of the currently captured image 36, it is possible to determine, by means of either a relative or absolute position determination, the position of the elevator car 14 in the elevator shaft 12 in the direction of travel 22.

Figure 3:
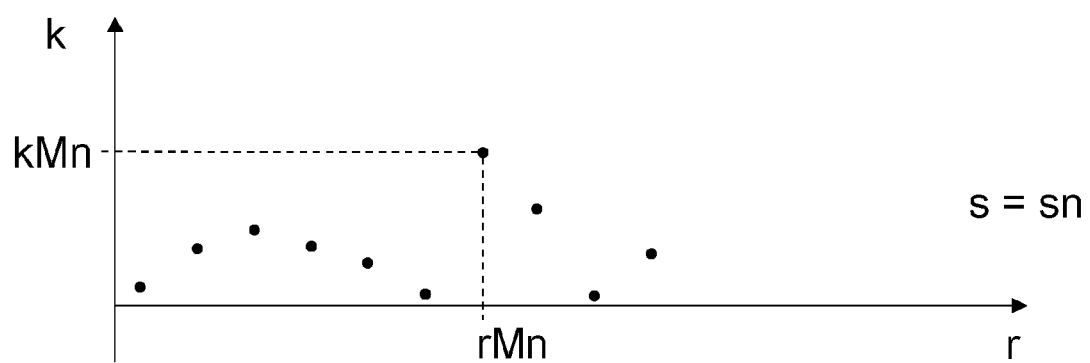
FIG. 3 shows correlation coefficients of a comparison image with an image therebelow of a current comparison region of a currently captured image during different displacements transverse to a direction of travel (x direction) and a constant displacement in the direction of travel (z direction) of the elevator car.

In FIG. 3, the correlation coefficients are shown by way of example over the possible r values, i.e. the possible displacements in the x direction, and a fixed s value, i.e. a constant displacement in the z direction.

According to FIG. 3, the correlation coefficient reaches the maximum value kMn at an s value of sn and an r value of rMn. This means that, during a fixed displacement of sn in the z direction during a displacement by rMn in the x direction, the comparison image 34 has the greatest correlation with the image therebelow of the current comparison portion 38 of the currently captured image 36.

The computer unit 30 determines, for each possible s value s=sn, the specific (local) maximum correlation coefficient kMn and the associated displacement rMn in the x direction. Then the computer device 30 determines the maximum correlation value kMax of all determined (local) maximum correlation coefficients kMn, which maximum correlation value represents the absolute maximum of the correlation coefficients and thus of the described three-dimensional surface. The position of the comparison image 34 in the current comparison region 38 results from the associated s and r values of the absolute maximum of the correlation coefficient.

The described calculation of the correlation coefficient may be considered a special case of a normalized cross-correlation in which the mean values of the pixel values of the compared images are taken into account.

Lastly, it should be noted that terms such as "having", "comprising" and the like do not preclude other elements or steps, and terms such as "a" or "one" do not preclude a plurality. Furthermore, it should be noted that features or steps that have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A system for determining a position of an elevator car of an elevator installation, which car is movably arranged in an elevator shaft, the system comprising:
   a computer unit;
   an imaging unit arranged on the elevator car and adapted for capturing images of at least one of shaft components and shaft equipment used for functions in the elevator installation other than providing the images, the images including individual pixels, and transmitting the images to the computing computer unit;
   the computer unit adapted to receive the transmitted images from the imaging unit, compare a currently captured image of the transmitted images with at least one stored comparison image of the at least one of the shaft components and the shaft equipment in a direction of travel of the elevator car, and determine a current position of the elevator car in the direction of travel based upon the comparison of the currently captured image with the at least one stored comparison image; and wherein the computer unit is adapted to compare the currently captured image with the at least one stored comparison image transversely to the direction of travel to determine the current position of the elevator car in the direction of travel.

2. The system according to claim 1 wherein the computer unit takes into account, in the compared images, a plurality of pixels adjacent to one another in the direction of travel and transverse to the direction of travel during the comparison of the currently captured image with the at least one stored comparison image.

3. The system according to claim 1 wherein the computer unit determines the position of the at least one stored comparison image in the currently captured image during the comparison of the currently captured image with the at least one stored comparison image.

4. The system according to claim 1 wherein the computer unit compares the currently captured image with the at least one stored comparison image utilizing a normalized cross-correlation.

5. The system according to claim 4 wherein the computer unit takes into account mean values of values of the pixels in the compared images during the normalized cross-correlation.

6. The system according to claim 1 wherein the computer unit post-processes one of the images transmitted by the imaging unit and stores the post-processed image as the at least one stored comparison image.

7. The system according to claim 6 wherein the computer unit subtracts a mean value of all values of the pixels of the one image from each of the pixel values during the post-processing.

8. The system according to claim 7 wherein the computer unit determines and stores a structure parameter characterizing a structure of the post-processed image and takes the parameter into account during the comparison of the currently captured image with the at least one stored comparison image.

9. The system according to claim 6 wherein the computer unit stores a post-processed portion of the one image as the at least one comparison image.

10. The system according to claim 9 wherein the computer unit subtracts a mean value of all values of the pixels of the post-processed portion of the one image from each of the pixel values during the post-processing.

11. The system according to claim 10 wherein the computer unit determines and stores a structure parameter characterizing a structure of the post-processed image portion and takes the parameter into account during the comparison of the currently captured image with the at least one stored comparison image.

12. A method for determining a position of an elevator car of an elevator installation, which car is movably arranged in an elevator shaft, comprising the following steps:
- capturing images of shaft components and/or shaft equipment used for other functions in the elevator installation, the images including individual pixels, using an imaging unit arranged on the elevator car;
- comparing a currently captured one of the images with at least one stored comparison image of the shaft components and/or shaft equipment in a direction of travel of the elevator car;
- also comparing the currently captured image with the at least one stored comparison image transversely to the direction of travel; and
- determining from the comparisons a current position of the elevator car in the direction of travel.

* * * * *